June 23, 1964  E. R. KRETZMER  3,138,717
VARIABLE PULSE LENGTH CODE DETECTOR
Filed Sept. 16, 1960
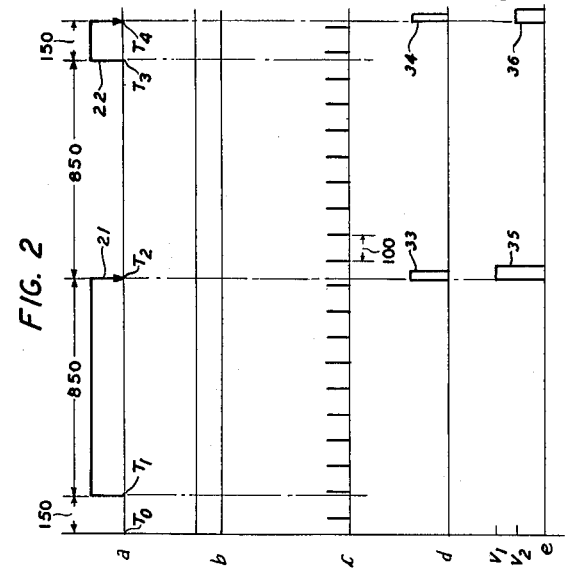
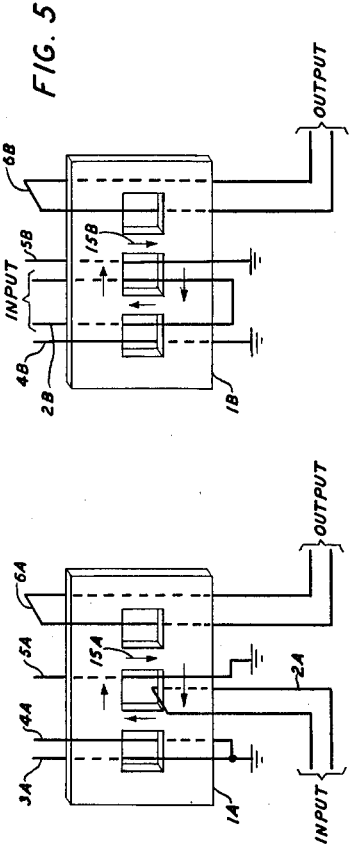
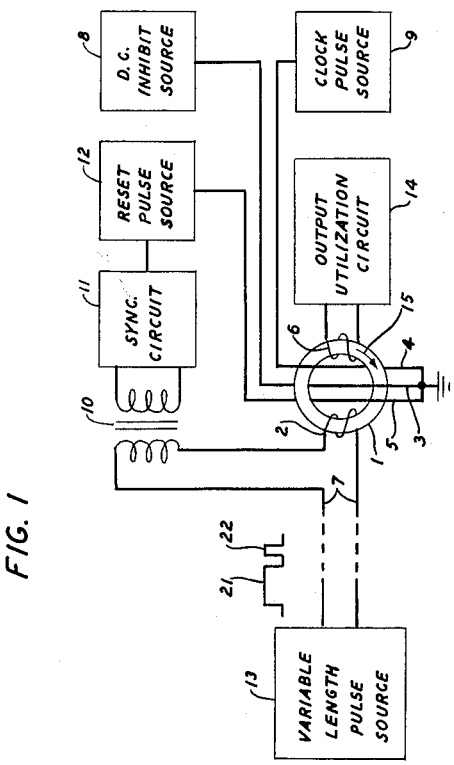
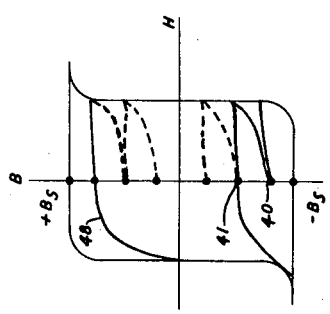
INVENTOR
E. R. KRETZMER
BY
Kenneth B Hamlin
ATTORNEY

United States Patent Office 3,138,717
Patented June 23, 1964

3,138,717
VARIABLE PULSE LENGTH CODE DETECTOR
Ernest R. Kretzmer, New Providence, N.J., assignor to Bell Telephone Laboratories, Incorporated, New York, N.Y., a corporation of New York
Filed Sept. 16, 1960, Ser. No. 56,599
8 Claims. (Cl. 307—88)

This invention relates to detector circuits and, more particularly, to such circuits for determining the length of variable length pulses.

Variable length pulses are sometimes employed in data transmission systems to transmit binary information between sending and receiving locations, a long pulse representing a binary "1" and a short pulse representing a binary "0." Advantageously such transmission is on a balanced direct current transmission basis. A balanced type transmission line is well known in the art and is generally defined as that type of line having its impedances symmetrically disposed with respect to a particular reference point, such as objects at ground potential. Detection circuitry then recognizes the different pulse lengths and translates or converts the variable length pulse information into a different type of pulse modulation.

Priorly arrangements for reception and detection of variable length pulse codes have generally involved going from balanced to unbalanced operation by means of a line transformer, whereby any direct current transmitted is lost, as are some of the advantages of balanced line transmission, such as low noise and cross talk factors. A resistance capacitive network followed by a pulse generator has been employed in such detection circuitry.

Balanced detection circuits utilizing relays have also been suggested. Such arrangements, however, are not useful with high speed transmission of the variable length pulses.

It is therefore an object of this invention to provide an improved circuit for detecting the length of variable length pulses.

It is a further object of this invention to provide improved detector circuits for translating or converting variable length pulse modulated information into pulse-amplitude-modulated information.

It is a further object of this invention to provide an improved detector circuit for variable length pulses that may be used directly with balanced transmission lines, may be used to detect pulses of very widely divergent lengths, and which utilizes few components with a high degree of reliability.

These and other objects of this invention are attained in an illustrative embodiment thereof wherein a magnetic core having a substantially rectangular hysteresis characteristic has wound thereon, or inductively associated therewith, an input winding, an inhibit winding, a cancellation winding, a reset winding, and an output winding. In accordance with an aspect of my invention the variable length pulses are applied to the input winding, thereby tending to cause a magnetic flux to be generated in one direction in the magnetic core. However, an inhibit bias source applies a particular value of continuous bias current to the inhibit winding so as to tend to generate an opposing magnetic flux in the core, thereby canceling or inhibiting the flux from the input variable length pulses.

Concomitantly, a clock pulse source applies a series of periodic short pulses to the cancellation winding. These pulses tend to generate a flux in the same direction in the core as the input pulses. Thus, during the occurrence of both the input and clock pulses, flux is generated in the first direction in the core, whereas during the occurrence of only the bias and input pulses no flux is generated in the core. In this manner, the flux change occurring only during the clock pulses causes a step-wise switching of the remanent state of the core from a first stable state of magnetization toward a second state.

Magnetic cores having substantially rectangular hysteresis characteristics have two stable states of magnetic remanence when they are completely switched. However, such cores can be partially switched from one stable state toward the second completely switched stable state depending on the length and magnitude of the signals applied. Accordingly, a very short pulse may partially switch the remanent magnetization toward, but not reaching, the second completely switch stable remanent state.

Different length pulses themselves applied directly to an input winding of a magnetic core may therefore switch different amounts of magnetic flux. A reset pulse applied after such partial switching will reverse the magnetization back to the initial stable state and an output pulse having an amplitude indicative of the duration of the input pulse may be obtained. Such input pulses, however, must be of the order of a microsecond or less as longer pulses will, in each case, completely switch the core regardless of the different lengths of the pulses, before the termination of the input pulse. Accordingly, pulses in the millisecond range, as are commonly used for data transmission, can not be directly detected.

In accordance with my invention, however, the core only switches its remanent magnetization during the application of the clock pulses, the switching thus being step-wise and occurring over a longer time interval as determined by the duty cycle of the clock pulses. This cycle may be varied or easily adjusted depending upon the lengths of the transmitted pulses to be detected.

In accordance with this embodiment of my invention, at the termination of the input pulse, regardless of its length, a reset pulse is generated in response to the trailing edge of the input pulse. This reset pulse, applied to the reset winding, resets the magnetic core, thus causing an output signal to appear in the output winding dependent upon the degree of switching of the remanent condition of the core; to state this differently, the amplitude of the output pulse will be dependent upon the number of clock pulses that have generated flux in the core due to the simultaneous presence of the input pulse which cancels the effect of the bias current.

It is a feature of this invention that a magnetic core having bistable states of magnetic remanence be utilized to detect the length of variable length input pulses and to translate them to different amplitude output signals.

It is a further feature of this invention that no flux change is normally generated by the input pulses except in the presence of short clock pulses periodically applied. Accordingly, a bias or inhibit signal may be applied continuously to prevent flux changes in the core except on the simultaneous presence of the input and clock signals.

It is yet another feature of this invention that a series of short pulses sample an input pulse and thereby allow the input pulse to step-wisely switch the remanent magnetization of a magnetic core from a first state toward a second state and that the remanent magnetization be completely switched back to the first state responsive to the termination of the input pulse.

It is still another feature of this invention that the termination of each of the variable length input pulses enables the reset means to generate a magnetic flux completely switching the remanent magnetization in the magnetic core from the different second conditions switched by the variable length input pulses to the stable first condition.

It is another feature of this invention that the input winding on the magnetic core terminate a balanced direct current transmission line, thereby enabling direct balanced operation.

A complete understanding of these and other objects and features of this invention may be gained from consideration of the following detailed description of an illustrative embodiment thereof when read with reference to the accompanying drawing, in which:

FIG. 1 depicts an illustrative embodiment of this invention;

FIG. 2 shows the plurality of signals applied to the plurality of windings and the resultant output signal;

FIG. 3 shows the step-wise switching of the remanent magnetic flux with reference to a characteristic hysteresis loop;

FIG. 4 shows an alternative arrangement of the magnetic core employed in this invention; and FIG. 5 shows another alternative arrangement of the magnetic core employed in this invention.

Referring more particularly to the drawing, in FIG. 1 a toroidal magnetic core 1 has wound thereon an input winding 2, an inhibit winding 3, a cancellation winding 4, a reset winding 5 and an output winding 6. The magnetic core 1 comprises a magnetic material having a substantially rectangular hysteresis characteristic, as is known in the art.

The input winding 2 is connected, in series with the input winding of a transformer 10, to conductors 7 which advantageously comprise a balanced direct current transmission line of the conventional two-wire type. At the remote end of the balanced transmission line is a variable length pulse source 13 which may be of any type known in the art for the transmission of data in the form of two or more variable length pulses. For the transmission of binary information pulses of two lengths, such as pulses 21 and 22, depicted in FIGS. 1 and 2, are applied to the lines 7 by the source 13 at the data transmitter.

The inhibit winding 3 is connected at one terminal to ground and at the other terminal to a direct current inhibit source 8. The direct current inhibit source 8 may be of any type known in the art and applies a predetermined amount of continuous current such as shown in line b of FIG. 2 to the inhibit winding 3 to generate a flux in the magnetic core opposing and inhibiting the flux generated by the input winding 2.

The cancellation winding or uninhibit winding 4 is grounded at one terminal and connected at the other terminal to a clock pulse source 9. The clock pulse source 9 may be of a type known in the art and generates a series of periodic short pulses such as those depicted in FIG. 2, line c. These pulses are applied to the uninhibit or cancellation winding 4 to generate short pulses canceling the flux tending to be generated by the inhibit winding 3, thereby sampling the input pulse and permitting the output pulst to generate incremental quantities of flux.

The reset winding 5 is connected to ground at one terminal and to a reset pulse source 12 at the other terminal. The reset pulse source 12 is connected to and actuated by a synchronizing circuit 11. When energized, the reset pulse source 12 applies a pulse such as that shown in FIG. 2, line d to the reset winding 5, causing the complete switching of the remanent magnetization of the magnetic core 1 to its original condition.

The synchronizing circuit 11 may be of a type known in the art and is enabled by the trailing end of each of the input pulses from line 7. The input pulses, such as pulses 21 and 22, are applied to the synchronizing circuit by the transformer 10, which interconnects the input line 7 to the synchronizing circuit 11 while at the same time providing direct current isolation. Transformer 10 may advantageously be of a limited band pass type, that is, with poor low-frequency response; so that it tends to differentiate the input pulses, producing short pulses at the transitions of the input signals. Such a transformer is advantageously economical.

The switching of the remanent magnetization of core 1 back to its initial condition induces an output signal, such as that shown in line e of FIG. 2 in the output winding 6. The output winding 6 is connected to an output utilization circuit 14, which may be located, for example, at the receiving end of a data system and which utilizes the output signal to energize other associated equipment.

Having described the structural elements and details of the embodiment depicted in FIG. 1, its operation will henceforth be described with reference to FIGS. 2 and 3. FIG. 2, line a shows the input pulses 21 and 22 generated by the variable length pulse source 13. They are shown as being positive, however, negative pulses or alternately positive and negative pulses can be used with some changes in the circuit. The magnitude of these current pulses can advantageously be variable, and is not stringently set, but dependent upon the circuit design, for example it depends upon the number of windings on the magnetic core. The length of these current pulses and the period between them is also variable and advantageously can be adjusted for the particular equipment being used. As an illustrative example, the long input pulse 21 is 850 microseconds and input pulse 22 is 150 microseconds, and the period between the trailing edges of each of the input pulses is 1000 microseconds. These input pulses are applied by the balanced transmission line 7 to the input winding 2 to tend to generate a clockwise flux in the magnetic core 1 as illustrated in FIG. 1 by the clockwise arrow 15 and switch the remanent magnetization from a stable first condition shown as point $-B_s$ on the hysteresis loop in FIG. 3 toward a second stable condition $+B_s$.

Line b of FIG. 2 shows the continuous current applied by the direct current inhibit source 8 to the inhibit winding 3 to generate a continuous counterclockwise flux in the magnetic core 1, thereby inhibiting the clockwise flux 15 generated by the input winding 2. The magnitude of the continuous current must be such that the quantity of flux generated by the inhibit winding is sufficient to completely cancel the flux 15 generated by the input winding 2. Accordingly, when no other signal is applied to the other windings, no flux change is produced in the core and no switching of the remanent magnetization of the magnetic core from the stable first or negative condition $-B_s$ toward the second condition $+B_s$ will occur.

However, clock pulse source 9 applies periodic short duration current pulses to the cancellation winding 4. FIG. 2, line c shows these clock pulses. The length of the clock pulses is very short such as an impulse and the period between the clock pulses is substantially long. An example of the pulse length is 0.1 microsecond and the period therebetween is 100 microseconds. These and the other values discussed herein may, of course, be varied and are to be considered soley for the purpose of explaining the principles of this invention. During time $T_0-T_1$ one clock pulse is applied to the cancellation winding, during time $T_1-T_2$ nine clock pulses are applied, during time $T_2-T_3$ eight clock pulses are applied and during time $T_3-T_4$ two clock pulses are applied to the cancellation winding 4. These current pulses cause the winding 4 to tend to generate pulses of flux in the clockwise direction. The magnitude of these clock pulses can advantageously be of any value such that each of these pulses of flux is sufficient to cancel the inhibit flux tending to be established by the inhibit winding 3. Thus, if there is an input pulse such as pulse 21 or 22 applied concurrently to the input winding 2 when the flux caused by the cancellation winding is canceling the intended generation of the inhibit flux the input pulse is sampled by the cancellation pulses and allowed to generate a clockwise flux 15 in the magnetic core 1.

FIG. 3 shows the build-up of magnetic flux 15 as the step-wise switching of remanent magnetization on the hysteresis loop. The value of magnetic flux indicated by the points $-B_s$, 40–48 and $+B_s$ are only for purposes of illustrating the principles of this invention. It is to be understood that a greater or smaller number of intermediate values of magnetic flux between $-B_s$ to $+B_s$ can be attained by adjusting the repetition rate and phasing of the clock pulses as will be explained hereinafter in greater detail.

In accordance with the principles of this invention, depending upon the number of clock pulses concurrently applied with the input pulse the remanent magnetization of the magnetic core step-wisely switches from the stable first condition $-B_s$ to different states of remanent magnetization such as 40–48 to $+B_s$. For example, during the long pulse, $T_1-T_2$, the first clock pulse enables the cancellation winding to tend to generate sufficient flux to cancel the inhibit flux tending to be established by the inhibit winding and the input pulse is permitted to switch the remanent magnetization of the magnetic core from the stable first condition $-B_s$ to an intermediate point 40. The subsequent eight clock pulses enable the input pulse to incrementally switch the remanent magnetization further toward the second stable condition, more particularly from point 40 to point 48. Although the build-up of magnetic flux is shown as being from a stable negative state $-B_s$ toward a positive state $+B_s$, the step-by-step switching of magnetic remanence could be done with equal ease from the stable positive state $+B_s$ to the negative state $-B_s$.

At time $T_2$ the trailing edge of the input pulse 21, as shown by the downward arrow actuates the synchronizing circuit 11 and thereby enables the reset pulse source 12 to generate a reset pulse 33 shown in line $d$ of FIG. 2. The reset pulse 33 is applied to the reset winding 5, which consequently generates sufficient flux to completely switch the magnetic remanence of the magnetic core 1 from the remanent state, e.g., point 48 established by the step-by-step build-up of magnetic flux to the stable first state $-B_s$. It is to be understood that the termination of each of the input pulses, regardless of its length, enables the reset means to reset the remanent magnetization from the different remanent condition established by the different length input pulses back to the same stable condition of initial remanent magnetization. If alternately positive and negative inpulses were utilized, the negative portion of the pulse could reset the remanent magnetization in the core without the use of the synchronizing circuit and reset pulse source.

In response to the switching of the remanent magnetization, there is induced an output potential of a particular amplitude in the output winding 6. This output signal commencing at time $T_2$ as pulse 35 of $V_1$ volts in line $e$ of FIG. 2 is then transmitted to the output utilization circuit 14.

In the same manner a step-by-step switching of magnetic remanence from the first state $-B_s$ toward the second state $+B_s$ is utilized during the length of the short input pulse 22. During time $T_3$ to $T_4$ input pulse 22 is applied to the input winding 2 and two clock pulses are applied to the cancellation winding 4. Hence, in accordance with the principles of this invention, two steps of the step-by-step build-up of magnetic flux are attained. These steps of magnetic remanence are switched from the extreme negative state $-B_s$ through state 40 to a less negative state 41. In a manner similar to that at the termination of input pulse 21, at time $T_4$, in response to the end of the pulse 22, a reset pulse 34 completely switches the partially switched state of magnetic remanence from the less negative state 41 to the same stable first state $-B_s$ and induces an output pulse 36 of $V_2$ volts as shown in line $e$ in the output winding 6. The amplitude of these output pulses is dependent upon the degree of completeness of the switching of the remanent magnetization. Hence the value of the output signal is directly indicative of the length of the input pulse.

In accordance with the principles of this invention, the repetition rate of the clock pulse source 9 is readily changeable, thereby applying a greater or fewer number of clock pulses concurrently with the input pulses, provided that the total time duration of the clock pulses does not exceed the switching time of the magnetic core. For example, during time $T_1-T_2$, during the long input pulse 21, instead of the nine input pulses as shown, five pulses may be applied, or during time $T_3-T_4$, during the input pulse 22, instead of two pulses, one pulse may be applied. It may be desirable to have only one clock pulse applied during the time $T_3-T_4$, in which case, in accordance with the principles of the invention, the repetition period of the clock pulses is lengthened and only one step of flux is accumulated in the magnetic core. The limit placed on the number of clock pulses that can be concurrently applied with the input pulses is governed by the characteristic of the magnetic core, such as its dimensions, its hysteresis loop, as well as the magnitude of the pulses and their direction.

When there is no input pulse applied concurrently with the inhibit current and clock pulses, there is no flux in the core to switch the remanent magnetization of the core. The inhibit current is sufficient to keep the magnetic remanence in the stable first condition $-B_s$ and the impulses applied by the clock pulse source 9 are not sufficient to overcome the inhibit bias to generate any switching flux. For example, between the times $T_0$ and $T_1$ and between $T_2$ and $T_3$ only the inhibit bias signal is applied to the inhibit winding 3 and one and eight clock pulses, respectively, are being applied periodically by the clock pulse source 9 to the cancellation winding 4, but no input pulse is being applied to the input winding 2. Accordingly, no switching flux is permitted to be present in the magnetic core 1 as is done between times $T_1$ and $T_2$ and times $T_3$ and $T_4$. No reset pulse is applied during that time and no output signal is induced in the output winding 6.

Referring again to FIG. 1, the magnetic core 1 is depicted as being of toroidal shape. It is to be understood that numerous other geometric shapes can be utilized applying the principles of this invention.

For example, in FIG. 4 an alternative magnetic core structure is shown. The magnetic core 1A comprises a magnetic material having substantially rectangular hysteresis characteristics and has four equal legs with two side rails delineating three apertures in a row. The side rails have at least twice the cross sectional area of the equal legs. Each of the windings 2A, 3A, 4A, 5A and 6A correspond to the respective windings 2, 3, 4, 5 and 6 in FIG. 1. An input signal such as pulses 21 or 22 applied to the input winding 2A generates a flux in the clockwise direction as shown by the arrows 15A. Application of a direct current inhibit signal to the inhibit winding 3A inhibits this flux around the right aperture. Concurrently the clock pulse source applies periodic pulses such as those shown in line $c$ of FIG. 2 to winding 4A, causing the periodic cancellation of flux generated by the inhibit winding 3A. Thus, the same cancellation of flux, as hereinbefore discussed with reference to FIG. 1, enables the step-by-step switching of remanent magnetization from the stable first condition, shown in the hysteresis loop of FIG. 3 as point $-B_s$ toward a second condition, point $+B_s$ about the right aperture. At the end of each input pulse, as hereinbefore discussed, a reset pulse is applied to reset winding 5A to completely switch the state of remanent magnetization from the second state to the stable first state. This switching of the remanent magnetization of the material around the right aperture causes a potential to be induced in the output winding 6A indicative of the length of the input pulses applied to the input winding 2A.

As a second example, in FIG. 5, another alternative magnetic core structure 1B is shown having the same dimensions and material as that depicted in FIG. 4. Each of the windings 2B, 4B, 5B and 6B corresponds to the respective windings 2, 4, 5 and 6 in FIG. 1. When an input signal is applied to the input winding 2B, a clockwise flux tends to be generated about the center aperture. However, input winding 2B is threaded through both the center aperture and the left aperture in such a manner that flux tending to be generated about one aperture is cancelled by the flux generated about the other, except in the leg between the left and center apertures. Hence, advantageously there is no need for the inhibit winding. The periodic application of the clock pulses to cancellation winding 4B enables the flux generated by the input winding threaded through the center aperture to generate a clockwise flux 15B. In this manner similar to the method discussed with reference to FIG. 1, a step-wise switching of the remanent magnetization from the stable first condition $-B_s$ toward the second stable condition $+B_s$ in the material surrounding the right aperture is accomplished. At the end of each input pulse, as hereinbefore discussed, a reset pulse is applied to the reset winding 5B to completely switch the remanent magnetization back to its initial state and thereby cause an output potential to be induced in the output winding 1B.

It is to be understood that the above-described arrangements are illustrative of the principles of this invention. Numerous other arrangements may be devised by those skilled in the art without departing from the spirit and scope of the invention.

What is claimed is:

1. A detector circuit for detecting variable length input pulses comprising a magnetic core having substantially rectangular hysteresis characteristics, input means including an input winding on said magnetic core energizable by said input pulses for tending to establish a first flux in the said magnetic core, sampling means for permitting said first flux to incrementally switch the remanent magnetization of said core from a first state to a second state, an output winding, and reset means under control of terminations of said input pulses for switching the remanent magnetization from said second state to said first state to induce in said output winding potentials of amplitudes dependent upon the number of incremental switchings of the remanent magnetization permitted by said sampling means during said input pulses.

2. A detector circuit in accordance with claim 1 wherein said sampling means further includes a bias winding on said core, means for applying a continuous current to said bias winding, a sampling winding, and a means for applying concurrently with said continuous current substantially short pulses periodically to said sampling winding thereby to permit said input pulses to effect switching of the remanent magnetization during discrete intervals of time corresponding to the short pulses.

3. A circuit for detecting the length of input pulses of a variable length code comprising a magnetic core having substantially rectangular hysteresis characteristics, first means responsive to said input pulses for incrementally switching the remanent magnetization of said core from a first to a second condition, said first means comprising input means including a first winding on said core energizable by said input pulses for tending to establish a first flux in said core and a sampling means including at least a second winding and a fifth winding on said core, one energizable by a continuous current and the other energizable by discrete sampling pulses for periodically sampling short intervals of said flux to allow said flux to switch said remanent magnetization in incremental steps, and second means responsive to terminations of said input pulses for generating output signals, said second means comprising means including a third winding on said core energizable upon terminations of said input pulses for switching said remanent magnetization from said second condition to said first condition and a fourth winding on said core, said switching of remanent magnetization from said second to said first condition inducing said output signals in said fourth winding of amplitudes dependent upon the number of incremental steps of switching of remanent magnetization allowed by said first means throughout the durations of respective input pulses.

4. A detector for detecting the length of successive variable length input pulses comprising a magnetic core having substantially rectangular hysteresis characteristics, means including a first winding on said core energizable by said input pulses for generating a first flux in said core, a second winding on said core, a current source, means connecting said second winding to said source to enable said second winding to generate a second flux opposing said first flux, a third winding on said core, a sampling pulse source generating periodic short sampling pulses, means connecting said sampling pulse source to said third winding for sampling said first flux thereby to permit said first flux to step-wisely switch the magnetic remanence of said core from a first condition to a second condition, a fourth winding on said core, a reset source, means connecting said reset source to said fourth winding, a fifth winding on said core, and synchronizing means responsive to terminations of said variable length input pulses for actuating said reset source, said actuation of said reset source causing switching of the magnetic remanence from said second to said first condition thereby inducing potentials in said fifth winding indicative of the length of said input pulses as determined by the number of step-wise switchings of remanent magnetization allowed by the sampling of said first flux caused by said input pulses.

5. A circuit for converting length modulated pulses to amplitude modulated pulses comprising a balanced direct current transmission line, a magnetic core having a substantially rectangular hysteresis characteristic, a first winding on said core connected in series with said transmission line and terminating said line, said first winding responsive to variable length pulses on said transmission line for tending to induce a magnetic flux in a first direction in said core, sampling means for permitting said flux to be present in said core only at discrete periodic intervals whereby the remanent magnetization of said core is switched in increments, an output winding on said core, and means responsive to the termination of a pulse on said transmission line for resetting said core to induce an output signal in said output winding of an amplitude dependent on the number of intervals, permitted by said sampling means.

6. A circuit in accordance with claim 5 wherein said sampling means includes a bias winding on said core, means for applying an inhibit bias to said bias winding to cancel the magnetic flux due to the applied pulses, cancellation winding on said core, and means for applying periodic sampling pulses to said cancellation winding, the flux generated in said core by said cancellation winding being in said first direction.

7. A detector circuit for converting length modulated pulses to amplitude modulated pulses comprising a magnetic core having first and second legs of a material having substantially rectangular hysteresis characteristics, a pair of side rails interconnecting said first and second legs to provide magnetic coupling therebetween, a bias and a sampling winding magnetically coupled to said first leg, an input and a reset winding magnetically coupled to said first and second legs, an output winding magnetically coupled to said second leg, means for applying a length modulated input pulse to said input winding to tend to establish a first flux in said first and second legs, inhibiting means for energizing said bias winding concurrently with application of said input pulse thereby inhibiting said first flux in said first and second legs, means for periodically energizing said sampling winding concurrently with application of said input pulse thereby to periodically permit said first flux to switch incrementally the remanent magnetization of said first and second legs, and means responsive to the termination of said input pulse for energizing said reset winding to reset the remanent magnetization of said first and second legs thereby to induce an output signal in said output winding of an amplitude dependent upon the number of increments of remanent magnetization permitted to be switched during said input pulse.

8. The invention defined in claim 7 wherein said bias winding is connected to said input winding and wherein said inhibiting means is said input means whereby said input pulse applied by said input means energizes both said input winding and said bias winding.

References Cited in the file of this patent

UNITED STATES PATENTS

| | | |
|---|---|---|
| 2,915,702 | Disson et al. | Dec. 1, 1959 |
| 2,988,653 | Samusenki | June 13, 1961 |